Nov. 25, 1941.  F. FERRÈ  2,263,679
MEANS FOR TOUGHENING GLASS
Filed Nov. 2, 1937  4 Sheets-Sheet 1
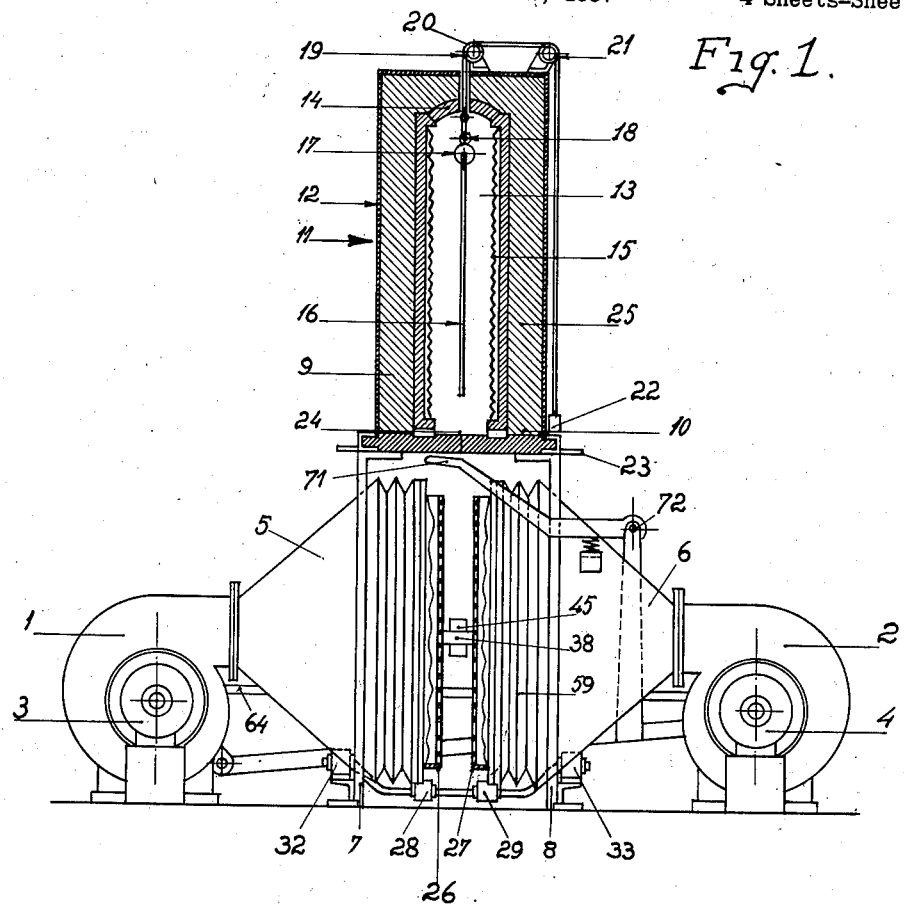
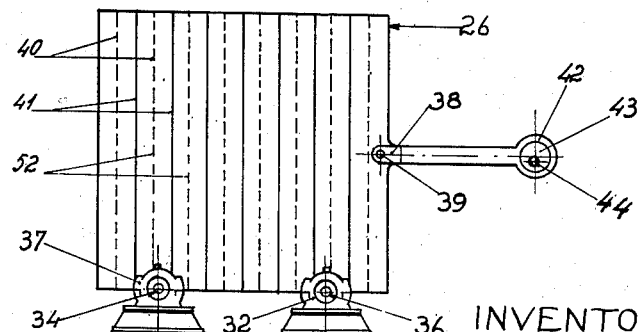
INVENTOR:
FERDINANDO FERRÈ
BY Haseltine, Lake & Co.
ATTORNEYS

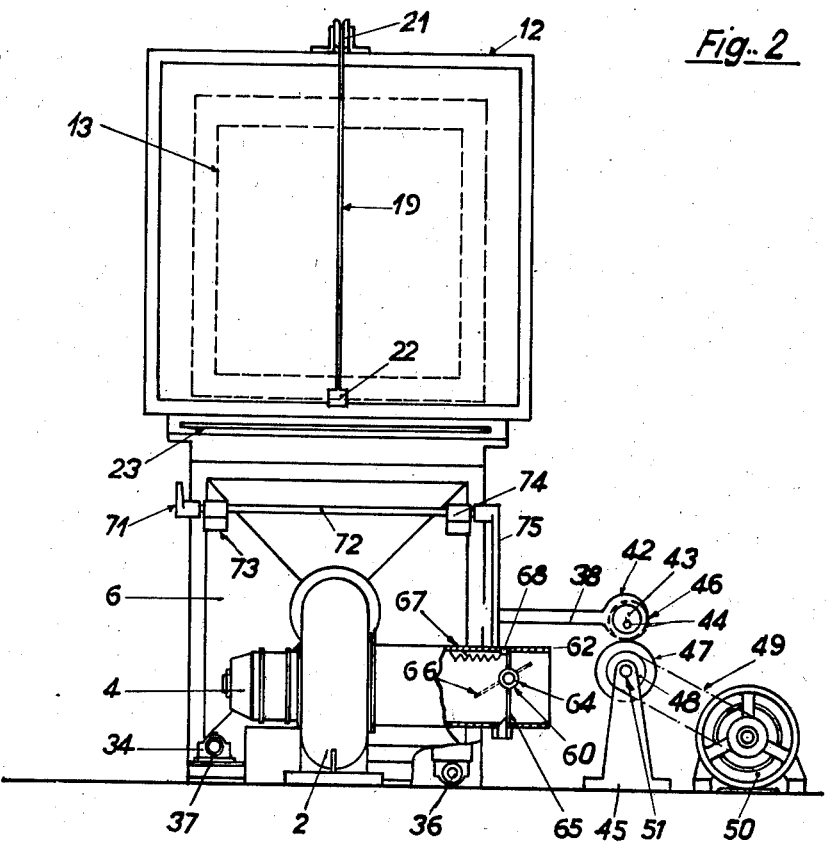

Nov. 25, 1941.  F. FERRÈ  2,263,679
MEANS FOR TOUGHENING GLASS
Filed Nov. 2, 1937   4 Sheets-Sheet 3

INVENTOR:
FERDINANDO FERRÈ
BY Haseltine Lake & Co.
ATTORNEYS

Nov. 25, 1941. F. FERRÈ 2,263,679

MEANS FOR TOUGHENING GLASS

Filed Nov. 2, 1937 4 Sheets-Sheet 4

INVENTOR:
FERDINANDO FERRE
BY Haseltine Lake & Co.
ATTORNEYS

Patented Nov. 25, 1941

2,263,679

UNITED STATES PATENT OFFICE 2,263,679

MEANS FOR TOUGHENING GLASS

Ferdinando Ferrè, Milan, Italy

Application November 2, 1937, Serial No. 172,417

4 Claims. (Cl. 49—45)

This invention relates to means for toughening sheet glass by directing a large number of strong jets of air against both sides of the glass while reciprocating the jets in order to distribute their effect on the glass surfaces being treated.

The main object of my invention is to toughen sheet glass by new means which makes it possible to regulate very nicely the degree of toughening which is effected, and also to carry out the operation in a highly efficient and economical manner.

Another object is to have special means for heating a sheet of glass and then immediately lowering the same into a cooling zone, and preferably, automatically projecting the air jets simultaneously upon both sides of the sheet glass in a balanced manner in order to avoid mechanical distortion of the glass and obtain the greatest possible effect of the air jets.

A further object is to provide special nozzle means which are so arranged and constructed that the air which has impinged upon the glass to cool the same, will promptly escape so as to avoid obstructing or interfering with the action of the jets directed against the glass.

Still another object is to provide special means for reciprocating nozzle means having faces provided with nozzles in a curvilinear path so that the air jets issuing from said nozzle means will move over the surface of the glass in corresponding manner.

A yet further object is to provide an apparatus for toughening glass of the character indicated with support means for nozzle means having faces provided with nozzles, as well as means for shifting or reciprocating said nozzle means in order to cause the air jets issuing therefrom to constantly shift in position across the surface of the glass sheet being cooled thereby.

It is also an object to provide an apparatus of this type with special nozzle means in the form of plates having faces provided with nozzles and flexibly connected to stationary air supply means. It may also be mentioned that among other objects it is also intended to provide apparatus of the mentioned character with automatic means for simultaneously starting the projection of the air jets against both sides of the sheet of glass being treated.

In order more fully to disclose the nature, features and operation of my invention, reference is had to the accompanying drawings which form a part hereof and in which:

Fig. 1 is an elevation partly in section of an apparatus embodying the salient features of my invention in practical form and serving as ideal means for carrying out the method according to my invention.

Fig. 2 is a side elevation of the apparatus of Fig. 1, as seen from the right side.

Fig. 4 is a rear elevation of the same apparatus, also having the upper portion removed in order to clarify the view.

Fig. 5 is a side view of a nozzle means or plate of the apparatus, having one face thereof provided with nozzles, said nozzle plate being shown with its mounting and a portion of an eccentric rod for reciprocating the same.

Figure 3:
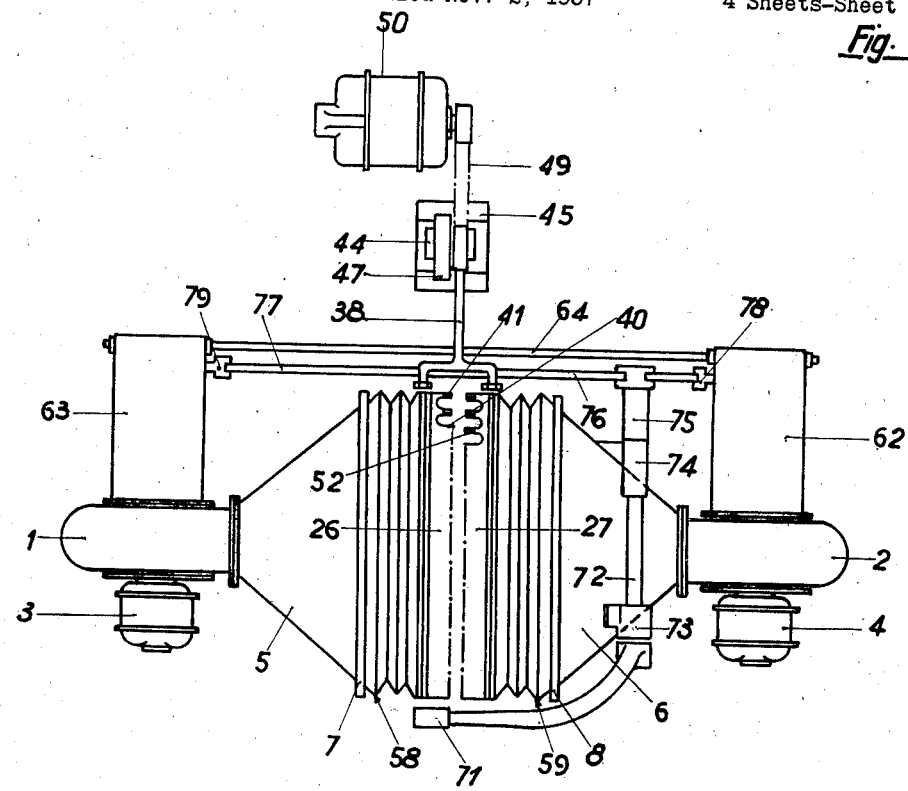
Fig. 3 is a top plan view of the apparatus of Fig. 1 with the upper portion removed in order to disclose the construction of the lower part of the apparatus more fully.
Figure 6:
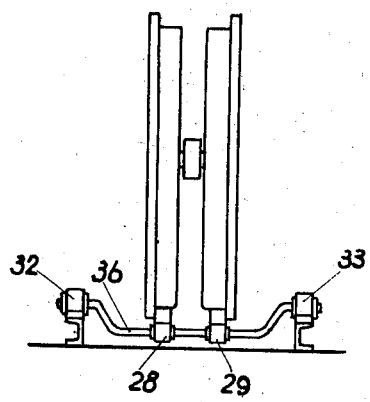
Fig. 6 is a view of two such nozzle plates alone, as well as the crank shafts supporting the same, while omitting the prime mover and other details.
Figure 12:
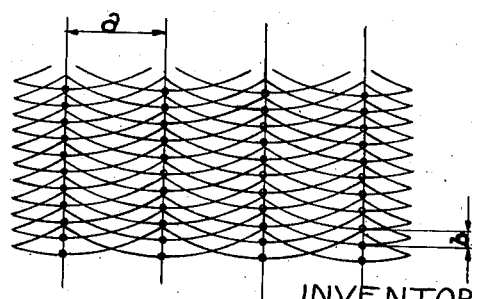

Fig. 12 diagrammatically represents the curvilinear path of travel of the nozzles of the nozzle plates.

Throughout the views the same reference numerals indicate the same or like parts.

In the art, toughened glass is generally understood to be such glass as has been heated to a pasty condition and then subjected to a sudden superficial cooling, and it is of course obvious that the compression of the exterior layers and the tension of the inner layers is greater or smaller in proportion as the period of cooling is shorter or longer. Naturally, the resistance to flexion of the plate glass thus treated is correspondingly greater or smaller, while it is also true that the uniformity of the resistance of the glass depends directly upon the degree of uniformity of heating and cooling the same.

The speed of cooling is a function of the amount of air or other cold gas sweeping the glass plate in a unit of time. To obtain great resistance, the time of cooling must be very brief (a few seconds), and the quantity of air to be fed to and distributed over the two faces of the glass plate is therefore great; hence the difficulty of constructing a good distributor of high yield which permits the greatest part of the air to sweep the face uniformly and to remove heat rapidly. Such difficulties increase with the dimensions of the plate and still more with the decrease of their thickness, as this requires a reduction of cooling time, or a greater quantity of air in the unit of time.

This is due to the fact that the air which has exerted a cooling action on the glass, must be rapidly discharged at the perimeter of the blowing apparatus without interfering with the jets of cold air because such interference would produce a counterpressure which diminishes the quantity and efficiency of the cold air acting on the glass.

Moreover, the great quantity of air dealt with and the velocity of effect that is required make it expedient that the air be blown onto the plate only when the plate itself is completely disposed between the cooling elements, and immediately with full pressure.

In known practice the plates or other members used for projecting jets of air against the glass in order to cool the same, are usually provided with rather long nozzles disposed upon two opposite surfaces so as to form a gap, but these nozzles are easily deformed by accidental contact with the glass being treated, due to the rapid motion to which these members are normally subjected.

Another known form is to provide series of pipes connected to a blower, but this results in a lack of uniformity of distribution of the air because the drop of pressure in the pipes is not equalized. Both of these types of structures have the drawback of great weight which is, of course, wasteful when it is considered that the nozzle or pipe structure must be subjected to rapid motion, so that serious vibration and wear and tear occur, as well as great expenditure of power.

In the art, there are, of course, various systems for projecting air jets or drafts of air upon the sides or portions of heated glass plates and among such systems the following points may be noted:

(A) The blowers are started before the introduction of the glass plates, but this may easily give rise to a shaking of the plate itself, with consequent breakage and deformation.

(B) The blowers are started only after the plates have been disposed between the blowing faces, but on account of the time needed for the blowers to regain working speed, this leads to a great retardation of the cooling effect.

(C) Valves are arranged after the blowers, which are opened by hand or mechanically when the glass is arranged between the blowing faces and after having previously started the blowers.

In order to eliminate the enumerated disadvantages and particularly with the foregoing objects in view, it is now proposed to introduce a highly practical, efficient and economical method for toughening glass, as well as means for carrying out the same. Hence, in the practice of my invention, a pair of blowers, 1, 2, are caused to be driven simultaneously by means of electric motors 3 and 4 or by means of belting to motors or other prime movers running to pulleys in more or less known manner, and these blowers are connected directly to two flaring distributors 5, 6, which are preferably secured to upright frames 7 and 8, upon which the base portions 9 and 10 of a heating chamber, generally indicated at 11, are supported. The heating chamber consists of an outer casing 12, which may be of sheet metal or the like and preferably has an outlet for exhaust gases (not shown), while within said casing is the heating chamber proper denoted by 13, preferably made of firebrick, or the like in the roof 14 of which several apertures are provided.

One or more of these apertures serve as clearances for supporting ropes or chains while heating means 15 such as electrical resistances or any known combustion devices are disposed in said chamber at the two sides for the purpose of uniformly heating the chamber to a sufficiently high temperature to cause a sheet of glass 16 to become pasty. Said glass is supported by clamping means 17, which include a rod or like member 18, which projects beyond the end of the sheet, said clamping means being attached to the one or more supporting chains 19, or the like which pass through the roof apertures and over sheaves 20 and 21 upon the top of casing 12. The chain continues downwardly from sheave 21 and is provided at the outer end with a counterweight 22, so that if a sliding door 23 in the base portion 10 is slightly withdrawn outwardly so as to open a narrow passage or slot 24 within the base portions of the heating chamber, it will be possible to lower the sheet glass 16 through said opening or slot by merely raising the weight 22. The space 25 between casing 12 and the wall of the heating chamber 13 may be packed with insulation such as mineral wool or the like.

Below the heating chamber is a cooling zone determined by and located between a pair of spaced metal nozzle plates, 26, 27 which are provided with bearings 28, 29, 30 and 31 upon their lower portions, said bearings being mounted upon crankshafts 36, 37, respectively. These last mentioned crankshafts are supported in the bearings 32, 33, 34 and 35, which in turn are rigidly supported on the frames 7 and 8, while between the nozzle plates 26 and 27, a forked member 38, is connected at the rear by means of a shaft 39.

Each of the nozzle plates consists of a series of deeply bent plates 40 connected at their projecting portions to rectangular, square or round iron bars or members 41 by means of continuous or close spot welding, or by any known means for producing absolutely tight connection. A series of closely spaced holes 52 are drilled in each of the iron members 41, with the result that the face of the nozzle plate has in each case a large number of jets disposed in close horizontal parallel lines but are spaced a greater distance on vertical lines. Normally, the forked member 38, is connected to both of the nozzle plates so that it will be possible to move both plates simultaneously upon their supporting rods.

The forked actuating member 38 has at its rear an eccentric strap or ring 42 cooperating with an eccentric 43 mounted on a shaft 44 supported upon a bearing stand 45. The eccentric is in the present case rigid with a gear or pinion 46 meshing with a larger gear 47 which in turn is rigid with a pulley 48 connected by a belt 49 to a motor 50. The pulley and gear 47 are mounted on a shaft 51 supported upon bearing stand 45, but can be replaced by a gear train to increase the ultimate speed of reciprocation of nozzle plates 26 and 27. As these plates 26—27 are mounted on the crankshafts 36—37, and as the eccentric 43 has a radius of eccentricity less than the eccentricity radius of the crankshafts, (around one-half) the plates will reciprocate following a curvilinear path, being exactly the arc of a circle with a radius corresponding to the eccentricity of the crankshafts.

Thus the air jets issuing from the openings 52 will all move following an arc and mix together to produce a reticular series of lines as represented in Fig. 12.

This movement can be obtained with eccentrics instead of mounting the faces on crankshafts or in any other way and structures which may occur to any one skilled in the art, and I am thus not limited to what is shown or described herein.

Figure 9:
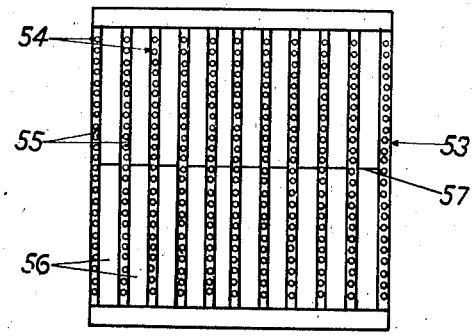
Fig. 9 is a modified form of nozzle plate.
Figure 10:
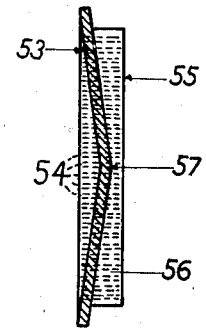
Fig. 10 is a section of the nozzle plate of Fig. 9 as taken on line X—X, of Fig. 11.
Figure 11:
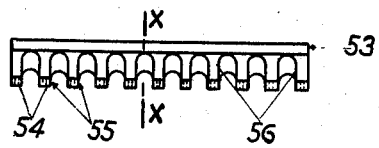
Fig. 11 is another view of the plate of Fig. 9 as seen from above.
Figure 8:
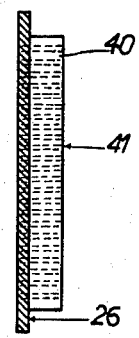
Fig. 8 is a sectional view of the same nozzle plate taken on line Y—Y in Fig. 7.
Figure 7:
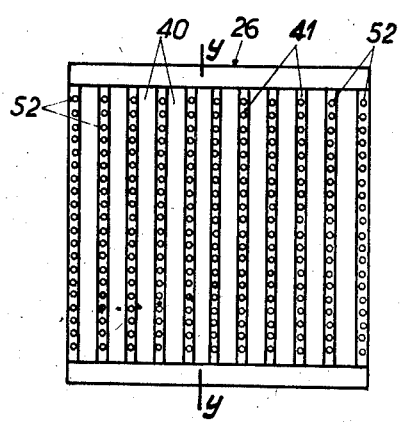
Fig. 7 illustrates a form of nozzle plate having one face provided with nozzles.

In the mentioned Fig. 12, the jets will describe the curves which are spaced apart a distance indicated by $b$ and the distance between the peaks of each set of jets and those opposite is indicated at $a$, twice this distance $a$ being the amplitude of swing of each set of jets. On the other hand it is very desirable to cause the air to escape rapidly when it has impinged upon the hot sheet of glass when the latter is located between plates 26 and 27, so that nothing will in any manner obstruct or interfere with the direction of projection of the air jets from the plates against the glass. The bent plates 40 provide deep channels for the escape of the hot air rebounding from the glass upwardly and downwardly along said channels. In order to enhance the effective operation of these channels, a nozzle plate 53 as shown in Figs. 9, 10 and 11 may be provided with bends or projecting folds which are provided with nozzle holes 54 in the convex portions 55 thereof, between which are disposed the channels 56 which increase in depth in two directions, that is, from a common center line or ridge 57 both upwardly and downwardly, so as to allow increasing clearances toward the top and bottom edges of the plate for the increasing amounts of air tending to escape along said channels from the center toward said edges.

It should be noted that in any case, the nozzle plates are connected to the distributors 5 and 6 by means which will allow said nozzle plates to move rapidly in their own planes without loss of air pressure. This connection may be effected in various ways, as for example, by accordion bellows 58, 59 made of fabric, or by a fold or two of sheet rubber, etc., or by any means for this or a similar purpose known in the art.

The air supplied from the blowers may be controlled by synchronized valves interposed between said blowers and the distributors, if desired, but in the present case, control valves 60, 61 are shown in the intake ports 62, 63 of the blowers. These valves are mounted on a common shaft 64 so that both valves will operate in synchronism. The shaft preferably passes through the upper portion of each valve so that the lower portion of the same as at 65 has a larger area than the portion above shaft 64. To allow the movement of the valves with the shaft not centered, the valves are circular but with two circular sections taken off on lines perpendicular to the shaft. These two circular sections are substituted by fixed sections on the duct at 80, 81, 82, 83. This being the case with both valves, the mere act of starting the one or more motors or the like which drive the blowers, will create a suction in the intake ports which will tend to swing the valves open inwardly as indicated in broken lines at 66.

Normally, a tension spring 67 keeps each valve closed against a stop 68, while resiliently operated latches 69, 70 keep the valves locked in said closed position. In order to control the opening of the valves, automatic means may be included for simultaneously releasing both, so that the air is projected at the same instant against both sides of the glass being treated. Thus, a trip lever 71 mounted on a shaft 72 is located in the path of one end of rod 18 upon the glass clamp 17 so that when the glass sheet is lowered into the cooling zone between nozzle plates 26, 27, this rod will strike the trip lever and will depress the same.

To the rear end of the lower shaft which may be supported in bearings 73, 74 upon the distributor 6, is fixed a swinging lever 75 having a pair of links 76, 77 connected thereto, and the latter in turn are preferably connected to two bell crank levers 78, 79 pivotally mounted on intake ports 62, 63. These bell crank levers are capable of retaining the latches 69, 70 of the valves in raised closing positions and also of lowering the same clear of the arc of movement of said valves.

Thus, upon the trip lever being operated, the blowers both being in operation, the rear lever 75 will swing toward intake port 62 and by means of links 76, 77 will cause bell crank lever 78, 79 to lower latches 69, 70, with the result that both valves 60 and 61 swing open and allow air to enter the blowers and be projected against the two sides of the glass between nozzle plates 26, 27. If the power is cut off so that the blowers stop, the glass having been removed by means not shown, the suction in the intake ports will cease, and the spring 67 will then pull valve 60 shut against stop 68, the valve sweeping past latch 69 which snaps into locking position behind the valve 60. As this valve is mounted on the same shaft 64 with valve 61, the latter tends to be synchronously closed therewith. In view of this, the link 77, lever 79 and latch 70 can be dispensed with, if desired, as valve 61 will be locked, released, opened and closed together with valve 60. Other valve means and locking and tripping means may of course be used.

Manifestly, variations may be resorted to, parts may be used without others, and the method may be carried out by other means altogether, within the scope of the appended claims.

It is of course clear that any useful metal may be used for constructing the corrugated plates, such as iron, steel, brass or any other alloy, or said plates could be formed of ceramic materials or highly refractory materials.

Having now fully described my invention, I claim:

1. Means for toughening sheet glass, comprising the combination of a nozzle plate, formed with a plurality of holes closely spaced in vertical and horizontal rows, said nozzle plate being located in a position to face a heated glass sheet when the latter is in a lowered position, means for shifting said sheet of glass from a heating zone above said nozzle plate to said lowered position parallel with and facing the nozzle plate, means for constantly oscillating said nozzle plate in its own plane and in an arcuate path so as to cause the jets of air issuing from the holes to sweep the surface of said glass sheet in corresponding manner, means for supplying air under pressure to said nozzle plate, including a gate valve pendently mounted in a position to swing open from closed position upon alteration of pressure of the air upon one side of said valve with respect to the other, a duct means for the air, a stop fixed to the duct means against which the valve abuts in said closed position, a shiftable latch normally disposed in the path of movement of said valve and resiliently assuming a position obstructing said valve and preventing the same from swinging into open position, and means for shifting said latch from said position so as to release said valve.

2. Means for toughening sheet glass, comprising the combination of a pair of nozzle plates formed with a plurality of holes closely spaced in vertical and horizontal rows, said nozzle plates being located in positions to face a heated glass sheet when the latter is in a lowered position, means for shifting said sheet glass from a heating zone above said nozzle plates to said lowered position parallel with and between the nozzle plates, means for constantly oscillating said nozzle plates in their own planes and in an arcuate path so as to cause the jets of air issuing from the holes to sweep the surfaces of said glass sheet in corresponding manner, means for supplying air under pressure to said nozzle plates, including a gate valve pendently mounted in a position to swing open from closed position upon alteration of pressure of the air upon one side of said valve with respect to the other, a duct means for the air, a stop fixed to the duct means against which the valve abuts in said closed position, a shiftable latch normally disposed in the path of movement of said valve and resiliently assuming a position obstructing said valve and preventing the same from swinging into open position, and means for shifting said latch from said position so as to release said valve, comprising a trip member connected to said latch and disposed in the path of said means for shifting the sheet of glass, so that when said sheet is lowered into the cooling zone between the nozzle plates, said means will engage against and operate said trip and thereby release the valve by shifting said latch.

3. Means for toughening sheet glass, comprising the combination of a pair of nozzle plates formed with a plurality of holes closely spaced in vertical and horizontal rows, said nozzle plates being located in positions to face a heated glass sheet when the latter is in a lowered position, means for shifting said sheet glass from a heating zone above said nozzle plates to said lowered position parallel with and between the nozzle plates, means for constantly oscillating said nozzle plates in their own planes and in an arcuate path so as to cause the jets of air issuing from the holes to sweep the surfaces of said glass sheet in corresponding manner, means for supplying air under pressure to said nozzle plates including two air distributors connected to the nozzle plates, a gate valve located within each of said air distributors and pendently mounted in a position effective to swing open from closed position upon alteration of the pressure of the air upon one side of each valve with respect to the other, said valves being individually disposed in the path of the air supplied by said air supply means, a stop associated with each of said valves determining the closed position for the same, a shiftable latch normally disposed in the path of movement of at least one of said valves and resiliently assuming an obstructing position preventing said valve from swinging away from closed position, means interconnecting said valves so as to cause the same to open and close simultaneously, and means for shifting said latch from said position so as to release the one valve so that both may swing open in response to said alteration of air pressure.

4. Means for toughening sheet glass, comprising the combination of a pair of nozzle plates formed with a plurality of holes closely spaced in vertical and horizontal rows, said nozzle plates being located in positions to face a heated glass sheet when the latter is in a lowered position, means for shifting said sheet glass from a heating zone above said nozzle plates to said lowered position parallel with and between the nozzle plates, means for constantly oscillating said nozzle plates in their own planes and in an arcuate path so as to cause the jets of air issuing from the holes to sweep the surfaces of said glass sheet in corresponding manner, means for supplying air under pressure to said nozzle plates including two air distributors connected to the nozzle plates, a gate valve located within each of said air distributors and pendently mounted in a position effective to swing open from closed position upon alteration of the pressure of the air upon one side of each valve with respect to the other, said valves being individually disposed in the path of the air supplied by said air supply means, a stop associated with each of said valves determining the closed position for the same, a shiftable latch normally disposed in the path of movement of at least one of said valves and resiliently assuming an obstructing position preventing said valve from swinging away from closed position, means interconnecting said valves so as to cause the same to open and close simultaneously, trip means connected to said latch and disposed in the path of said means for shifting the sheet of glass so that when said sheet is lowered into the cooling zone between the nozzle plates, said means will engage against and operate said trip means and thereby release the valves by shifting said latch.

FERDINANDO FERRÈ.